Patented Mar. 11, 1930

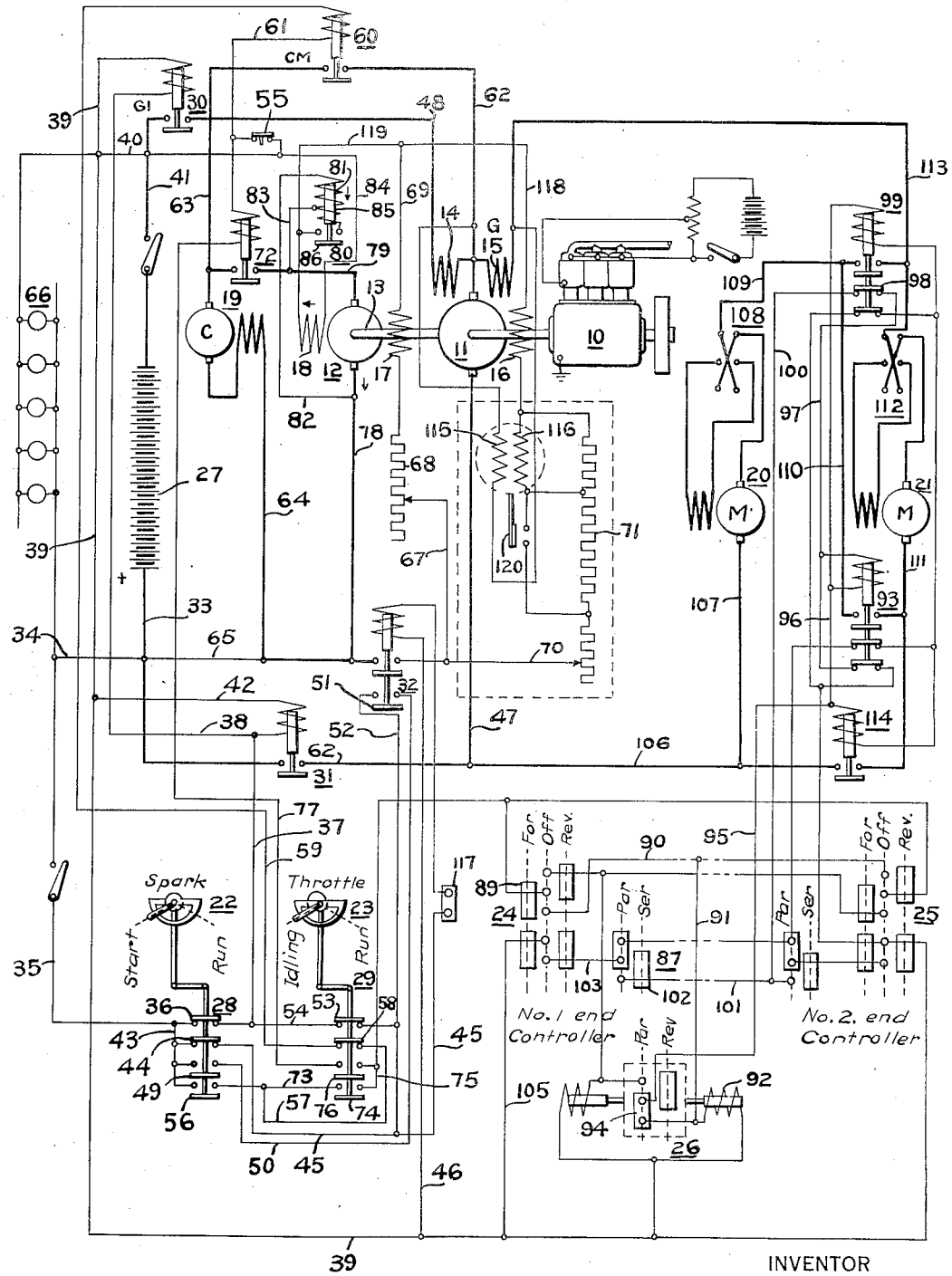

1,750,297

UNITED STATES PATENT OFFICE

ANDREW H. CANDEE, OF WILKINSBURG, PENNSYLVANIA, ASSIGNOR TO WESTINGHOUSE ELECTRIC & MANUFACTURING COMPANY, A CORPORATION OF PENNSYLVANIA

POWER SYSTEM

Application filed October 20, 1927. Serial No. 227,448.

The invention relates to power systems utilizing internal-combustion engines as prime movers and electric motors as work-performing units.

The object of the invention, generally stated, is the provision of a power system that shall be simple and efficient in operation and readily and economically manufactured.

A more specific object of the invention is to provide for operating the generator of a power system as a motor to start the engine.

Another object of the invention is to provide for utilizing the generator of a power system for charging the battery when the engine is idling.

A further object of the invention is to provide for closing and interrupting the charging circuit between the exciter of a power system and the battery, according as the exciter voltage rises above or falls below a predetermined value.

It is also an object of the invention to provide for operating the auxiliary motors, such, for example, as compressor motors, from the main generator of the power system when the engine is idling and from the exciter when the engine is loaded.

Other objects of the invention will, in part, be obvious, and will, in part, appear hereinafter.

The invention, accordingly, is disclosed in the accompanying drawing and comprises the features of construction, combination of elements and arrangement of parts which will be exemplified in the construction hereinafter set forth, and the scope of the application of which will be indicated in the claims.

For a fuller understanding of the nature and objects of the invention, reference should be had to the following detailed description, taken in connection with the single figure of the accompanying drawing, which is a diagrammatic showing of the power system showing the preferred circuit connections.

Referring now to the drawing, 10 designates, generally, an internal-combustion engine of a type suitable to be utilized as the prime mover of a power system. In this particular instance, an engine, having an ignition system, is illustrated, but it is to be understood that an oil engine or other variable-speed prime mover which may be operated at low speed when the main load is removed, such, for example, as a Diesel engine, may be substituted.

As will be observed, a generator 11 and an auxiliary generator or exciter 12 are mounted on the engine shaft 13. As illustrated, the generator 11 is provided with a series field winding 14, an interpole field winding 15 and a shunt field winding 16, while the exciter 12 is provided with a shunt field winding 17 and a series field winding 18.

In power systems, particularly power systems utilized for propelling vehicles, it is often desirable to provide auxiliary motors for operating auxiliary apparatus, such as compressors and the like. In this showing of the invention, only one auxiliary motor 19 is illustrated and hereinafter it will be referred to as the compressor motor.

When the power system is utilized for propelling a vehicle and the like, two driving motors 20 and 21 are usually provided. The motors 20 and 21, as illustrated, are of the series type and disposed to be connected in either series or parallel arrangement.

Since, in this particular embodiment of the invention, an internal-combustion engine provided with an ignition system is illustrated, the control means for the engine comprises a spark lever 22 and a throttle lever 23. As will be readily understood, the spark lever may be disposed for controlling the ignition circuit and the throttle lever 23 for controlling the supply of fuel to the engine. The connection of the spark lever 22 in the ignition circuit, and the throttle lever 23 in the fuel circuit is not illustrated since such devices are well-known in the art and would only complicate the present diagram.

The remainder of the apparatus, such as the controllers 24 and 25, which are normally mounted at opposite ends of the vehicle, and the reversing switch 26, are well-known in the art and, therefore, will not be described in detail, but their functions will become apparent as the description of the operation of the power system proceeds.

Assuming now that it is desired to cause the power system to function, the engine 10 is started. In order to start the engine 10, the generator 11 is operated as a motor to turn over the engine.

As shown, a storage battery 27 is provided for operating the generator 11 as a motor and the auxiliary apparatus when the engine is loaded. In order to connect the generator 11 across the battery 27, the spark lever 22 is thrown to its "start" position and the throttle lever 23 to its "idling" position, actuating the switches 28 and 29, respectively, to their lowermost positions.

As will be observed, actuating circuits for the switches 30 to 32, inclusive, are now established. The actuating circuit for the switch 30 may be traced from the battery 27 through conductors 33, 34 and 35, the interlock 36 on the switch 28, conductors 37 and 38, the actuating coil of switch 30, conductor 39, 40 and 41, back to the battery, while the actuating circuit for the switch 31 may be traced from the energized conductor 37, through the actuating coil of the switch, conductors 42, 40 and 41, back to the battery. The actuating circuit for the switch 32 extends from the energized conductor 35 through conductor 43, interlock 44 on the switch 28, conductor 45, the emergency trip button 117, the actuating coil of switch 32, conductor 46, back to the negatively energized conductor 39.

Upon the closure of the switches 30 to 32, inclusive, a circuit for operating the generator as a motor is established and may be traced from the battery 27, through conductor 33, switch 31, conductor 47, the armature of the generator, the series field 14 of the generator, conductor 48, switch 30 and conductor 41, back to the battery.

It will be readily understood that, as soon as the engine begins to operate, it will drive the generator and deliver current to the battery. The series field 14 serves to protect the battery against an excessive flow of current.

Immediately after the engine starts, the spark lever 22 is thrown to its run position, actuating the switch 28 to its uppermost position.

The actuating circuits for the switches 30 to 32, inclusive, are changed by the operation of the switch 28, but these switches are held closed. The new actuating circuit for the switches 30 and 31 may be traced from the positively energized conductor 35, through conductor 43, the interlock 49 on the switch 28, conductor 50, the interlock 51 on the switch 32, conductor 52, the interlock 53 on the switch 29, conductor 54, to the conductor 37, from whence the actuating circuits of the switches are the same as hereinbefore traced.

It will also be noted that the conductor 52 is connected to the conductor 45 so that the latter is positively energized when the switch 28 is actuated to its uppermost position. Therefore, the actuating circuit for the switch 32, as traced through the conductor 45, is maintained.

Since this power system was primarily intended to be utilized in propelling vehicles, provision is made for operating auxiliary apparatus, such as compressors and the like, (not shown). In order to illustrate the manner in which such auxiliary apparatus may be operated, a compressor motor 19, hereinbefore referred to, is shown connected in the circuit.

In a power system of this kind, in the interest of efficiency, it is desirable to operate the compressor motor 19 from the generator when the engine is running substantially without load, which is generally described by saying that the engine is idling. In some cases, it is undesirable to operate the auxiliary apparatus continuously, as in the case of a compressor. Accordingly, means is provided for automatically connecting and disconnecting the auxiliary apparatus to the generator when it is desired to operate it. In this particular power system, provision is made for connecting the compressor motor to the generator when the air pressure in the reservoir, (not shown) which is provided on all railway vehicles, falls below a predetermined amount and operates the governor switch 55.

Assuming now that the governor switch 55 is closed, an actuating circuit for the switch 60 is established which extends from the positively energized conductor 35, through conductor 43, interlock 56 of the switch 28, conductor 57, the interlock 58 on the switch 29, conductor 59, the actuating coil of the compressor motor switch 60, conductor 61 and governor switch 55, to the negatively energized conductor 41.

Upon the closure of the switch 60, the compressor motor is connected across the generator 11, the circuit extending from the armature of the generator 11, conductor 62, switch 60, conductor 63, the motor 19, conductors 64, 65 and 33, switch 31 and conductor 47, back to the generator.

The compressor-motor circuit will be interrupted upon the actuation of the compressor governor switch 55 to its open position upon the pressure in the reservoir reaching a predetermined value.

In order that the generator may be utilized for operating the compressor motor 19, charging the battery 27 and supplying a lighting circuit when idling, provision is made for energizing its field windings. In this instance, before the charging process is started, the generator shunt field 16 is connected across the battery, and an energizing circuit is established which extends from the battery 27, through conductor 65, resistor 71, field winding 16, conductors 118 and 119, exciter field 18, conductors 84, 40 and 41, to the negative terminal of the battery. When the generator voltage reaches a value greater than the battery voltage, and the charging process begins, the energizing circuit for the field winding 16 will be the same as traced from the battery, with the exception that it will have its origin at the positively energized conductor 106.

It will be noted that the lighting system of the vehicle, which is diagrammatically illustrated by lamps 66, is directly connected across the battery and, when the engine is idling, the generator output is divided between the charging of the battery and the lamp load. When the engine is loaded, the light circuit is supplied by the exciter.

When it is desired to load the engine to move the vehicle or do some other work, the throttle lever 23 is thrown to its run position, actuating the switch 29 to its uppermost position, interrupting the actuating circuits for the switches 30, 31 and 60. Further, an actuating circuit for the switch 60 cannot be established as long as the throttle lever 23 remains in its run positions. Therefore, the compressor motor cannot be connected to the generator 11 when the engine is loaded.

The actuation of the switch 29 to its uppermost position establishes a new actuating circuit for the switch 32 which extends from the positively energized conductor 35 through conductor 43, the interlock 49 on the switch 28, conductor 50, interlock 51 of the switch 32, conductors 52 and 45, the actuating coil of the switch 32 and conductor 46, back to the negatively energized conductor 39. Therefore, when the throttle lever 23 is thrown to its run position, the switch 32 is retained closed.

When it is desired to load the engine 10 and the generator 11, provision is made for energizing the field windings of the generator 11 and the exciter 12. As will be noted, the exciter shunt field 17 is connected directly across the battery 27, the circuit extending from the positive terminal of the battery through conductors 33 and 65, switch 32, conductor 67, variable resistor 68, field winding 17, conductors 69 and 119, field winding 18 and conductors 84, 40 and 41, back to the battery. The energizing circuit for the shunt field winding 16 of the generator extends from the positively energized conductor 65, through switch 32, conductor 70, resistor 71, which, as illustrated, is divided into sections, shunt field winding 16 and conductors 118, 119, field winding 18, conductors 84, 40 and 41, back to the battery 27.

In order to operate the compressor motor 19 when the engine is loaded, provision is made for connecting it to the exciter 13. The operation of the compressor motor 19, as hereinbefore explained, will depend upon the governor switch 55. Assuming that the governor switch is closed, an actuating circuit for the switch 72 will be established from the positively energized conductor 35, through conductor 43, the interlock 56 on the switch 28, conductor 73, interlock 74 on the switch 29, conductor 75, interlock 76 on the switch 29, conductor 77, the actuating coil of switch 72, conductor 61, the governor switch 55 and, through the conductors 40 and 41, back to the battery.

Upon the closure of switch 72, a motor circuit is established which extends from the exciter 12, through conductors 78, 65 and 64, motor 19, switch 72 and conductor 78, back to the exciter.

With a view to charging the battery when the engine and generator are operating under load, provision is made for connecting it to the exciter when the voltage of the latter has reached a predetermined value. The exciter-battery-charging circuit is controlled by a differential relay, shown generally at 80. Assuming now that the exciter voltage reaches a predetermined value sufficient for the charging operation, the voltage coil 81 of the relay, which is connected across the exciter, is sufficiently energized to actuate the relay. The exciting circuit for the voltage coil 81 extends from the exciter, through conductor 82, coil 81 and conductors 83 and 79, back to the exciter.

It will be noted that, upon the closure of the relay 80, a circuit is established which extends from the exciter 12, through conductors 78, 65 and 33, battery 27, conductors 41, 40 and 84, series field 18, the relay 80, the current coil 85 of the differential relay, conductors 83 and 79, back to the exciter.

If, for any reason, the speed of the engine is decreased, so that the voltage of the exciter is less than that of the battery, it is desirable that the relay 80 should function and interrupt the charging circuit. When the voltage of the exciter is less than that of the battery, current flows from the battery through conductors 33, 65 and 78, the armature of the exciter 12, conductors 79 and 83, the current coil 85 of the relay 80, the interlock 86 of the relay, the series field 18, conductors 84, 40 and 41, back to the battery. The action of the current coil 85 being no longer cumulative with that of the voltage coil 81, they neutralize one another and permit the relay to open under the action of gravity. In such manner, the charging circuit is interrupted when the exciter voltage becomes less than the battery voltage.

As pointed out hereinbefore, the lighting circuit is connected across the battery and, when the exciter is connected across the battery to charge it, the exciter output is divided, part being used for illuminating purposes and part for charging the battery.

Since the operation of a plurality of motors in series and in parallel relation from a generator is well-known, only a general description will be given. Assuming that it is desired to operate the motors 20 and 21 in series relation, one of the controllers, say controller 24, is thrown to its forward position, and the switch 87 to its series position, establishing a circuit extending from the energized conductor 73, through conductor 88, contact member 89 on the controller 24, conductors 90 and 91, the actuating coil 92 of the reversing switch 26, through the negatively energized conductor 39. Further, an actuating circuit for the series-relay switch 93 is established which may be traced from the positively energized conductor 91, through the contact segment 94 of the reversing switch 26, conductors 95 and 96, the actuating coil of the switch 93, conductor 97, interlock 98 on the relay switch 99, conductors 100 and 101, the contact segment 102 of the series-parallel switch 87, conductor 103, contact segment 104 on the controller 24 and conductor 105, back to the negatively energized conductor 39.

A motor-operating circuit is now established which extends from the generator 11, through conductors 47, 106 and 107, the armature of motor 20, reversing switch 108, the series field of motor 20 reversing switch 108, conductors 109, 110, the series switch 93, conductor 111, the armature of motor 21, the reversing switch 112, the series field of the motor 21, reversing switch 112, conductor 113 and the interpole field winding 15, back to the generator.

It will be readily understood that, by throwing the switch 87 to its parallel position, which is the one illustrated in the drawing, the relay switches 99 and 114 may be operated to establish parallel-circuit relations between the motors 20 and 21.

In power systems of this kind, particularly when they are applied to vehicles, it is desirable to provide for limiting the generator torque in order to prevent the possibility of stalling the engine by applying an excessive load. In order to accomplish this, a torque governor similar to the one disclosed in copending applications, Serial Nos. 227,459 and 227,460, filed in the name of Norman W. Storer and assigned to the Westinghouse Electric and Manufacturing Company, is utilized. As illustrated, the rotor winding 115 of the torque governor is connected across the interpole field 15, while the field winding 116 is connected in series with the shunt field 16 of the generator and across a section of the resistor 71. The switch member 120, disposed to be actuated by the governor, is connected to short-circuit a section of the resistor 71 to control the energization of the generator shunt field winding, in a manner set forth in the applications hereinbefore referred to.

Since numerous changes may be made in the above described power system and different embodiments of the invention may be made without departing from the spirit and scope thereof, it is intended that all matter contained in the above description or shown in the accompanying drawing shall be interpreted as illustrative and not in a limiting sense.

I claim as my invention:

1. In a power system, in combination, an internal-combustion engine, a generator driven by the engine, a battery disposed to be connected to the generator, and means disposed to control the connections between the generator and battery to provide for the charging of the battery when the engine is idling and for disconnecting the battery from the generator when the engine carries a load.

2. In a power system, in combination, an internal-combustion engine, a generator driven by the engine, a battery disposed to be connected across the generator, means for connecting the generator to the battery to operate it as a motor for starting the engine, said connecting means being adapted to maintain the battery-generator connections when the engine is idling, and means for interrupting the charging circuit when the engine is loaded.

3. In a power system, in combination, a generator, a battery, a compressor motor disposed to be connected to the generator, said compressor motor being disposed to be connected across the battery, and means for effecting the different connections of the compressor motor.

4. In a power system, in combination, a compressor motor, sources of power comprising a generator and a battery, each capable of operating the compressor motor, and control means for the power system operable to connect the compressor motor to the generator and battery, and to transfer the connections from one source of power to the other.

5. In a power system, in combination, an internal-combustion engine, means for controlling the operation of the engine, a generator driven by the engine, a compressor motor disposed to be connected to the generator, a battery capable of operating the compressor motor, means for connecting the compressor motor to the generator and battery, said connecting means being responsive to the operation of the engine-control means.

6. In a power system, in combination, an internal-combustion engine, means for controlling the operation of the engine, said control means having "idling" and "run" positions, a generator driven by the engine, a compressor motor disposed to be connected to the generator, a battery capable of operating the compressor motor, means operable by said engine control means for connecting the compressor motor to the generator and battery, said connecting means being adapted to connect the compressor motor to the generator when the engine-control means is in its "idling" position and to the battery when the control means is in its "run" position.

7. In a power system, in combination, an internal-combustion engine, a generator driven by the engine, means for controlling the operation of the engine, a battery, means actuated by said engine control means for connecting the battery to the generator, said connecting means being disposed for operation by the engine control means to interrupt the battery-generator connections when the engine is loaded.

8. In a power system, in combination, a variable speed engine, a main generator and an auxiliary generator driven by the engine, a plurality of auxiliary circuits disposed to be connected to the generators and means responsive to the loading of the engine for selectively connecting the battery to the generators.

9. In a power system, in combination, a variable-speed engine, a generator and exciter driven by the engine, a plurality of auxiliary circuits, means for controlling the loading of the engine, and means responsive to the actuation of the load controlling means for selectively connecting the auxiliary circuits to the generator and exciter.

10. In a power system, in combination, an engine adapted to be operated at different speeds, a generator driven by the engine, said generator developing a predetermined voltage when the engine is idling and a different voltage when the engine is loaded, an exciter for energizing the generator field windings, a plurality of auxiliary circuits to be supplied by the generator and exciter, and means responsive to the loading of the engine for selectively connecting the auxiliary circuits to the generator and exciter.

11. In a power system, in combination, an engine adapted to be operated at an idling speed and under load, a generator and exciter driven by the engine, said generator and exciter each being provided with differential and series field windings, auxiliary circuits disposed to be connected to the generator and exciter, means for controlling the loading of the engine and means responsive to the loading of the engine for selectively connecting the auxiliary circuits to the generator and exciter, said differential and series field windings of the generator and exciter being utilized to control the voltage supplied to the auxiliary circuits.

12. In a power system, in combination, an engine adapted to be operated at an idling speed and under load, a generator provided with differential and series field windings driven by the generator and capable of developing substantially constant voltages when the engine operates at its idling speed or under load, an exciter provided with differential and series field windings for energizing the generator field windings, said generator being driven by the engine and adapted to develop a substantially constant voltage when the engine is loaded and a battery providing another source of constant voltage supply, said battery being disposed to be selectively connected to the generator and exciter.

13. In a power system, in combination, an internal-combustion engine adapted to be operated at an idling speed and at a different speed under load, sources of subtantially constant voltage comprising a generator and an exciter driven by the engine and adapted to develop different predetermined voltages when the engine is idling and operating under load, and means for controlling the voltages delivered, to maintain them substantially constant for the different operating conditions of the engine, the battery providing another source of constant voltage, a plurality of circuits, and means responsive to the loading of the engine for selectively connecting the circuits across the sources of substantially constant voltage.

In testimony whereof, I have hereunto subscribed my name this 4th day of October, 1927.

ANDREW H. CANDEE.